Nov. 25, 1924.　　　　　　　　　　　　　　　　　1,517,201
O. J. EASLEY
LOADER
Filed Dec. 19, 1923　　　　4 Sheets-Sheet 1

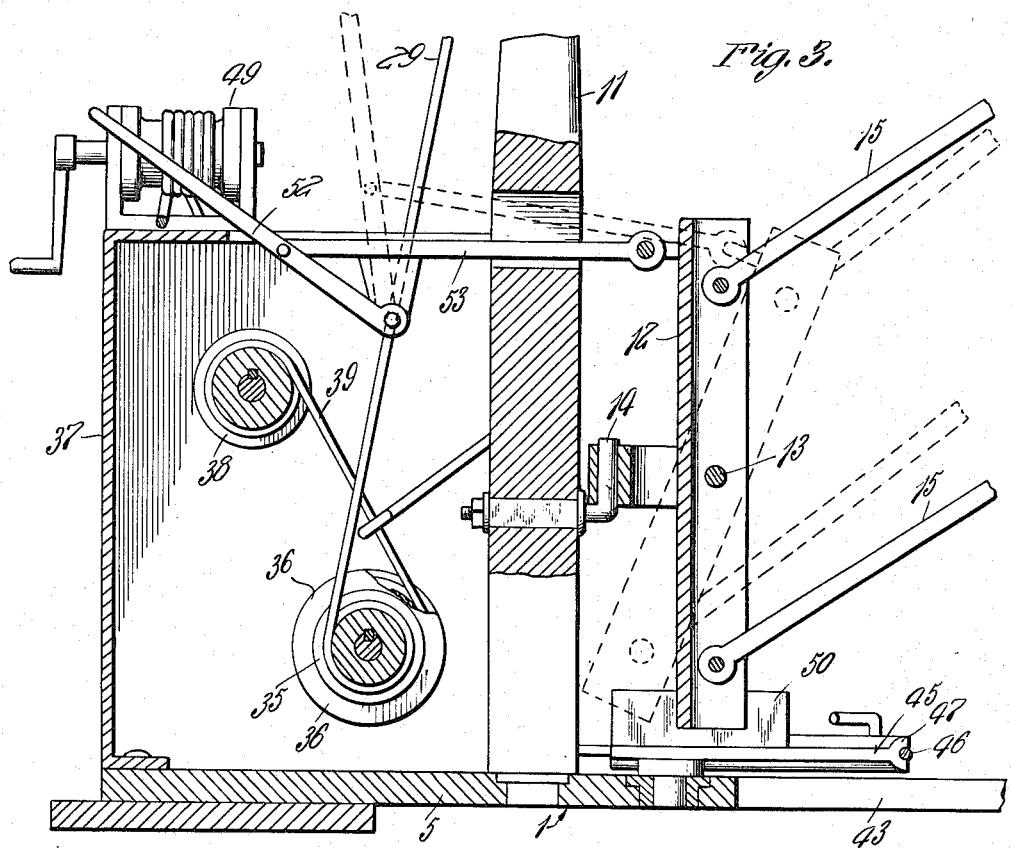
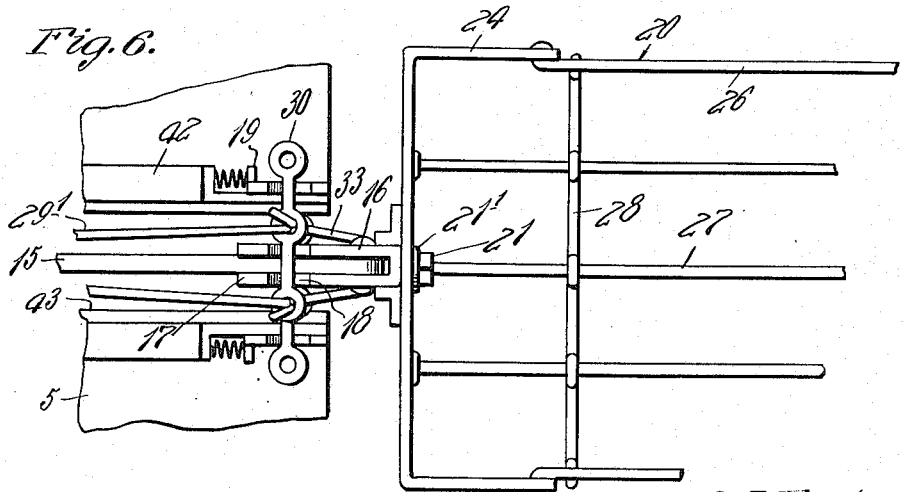

Nov. 25, 1924.

O. J. EASLEY

LOADER

Filed Dec. 19, 1923

O. J. Easley
INVENTOR

BY Victor J. Evans
ATTORNEY

Patented Nov. 25, 1924.

1,517,201

UNITED STATES PATENT OFFICE.

ORUS J. EASLEY, OF EAST AKRON, OHIO.

LOADER.

Application filed December 19, 1923. Serial No. 681,621.

*To all whom it may concern:*

Be it known that I, ORUS J. EASLEY, a citizen of the United States, residing at East Akron, in the county of Summit and State of Ohio, have invented new and useful Improvements in Loaders, of which the following is a specification.

This invention relates to improvements in loaders, the general object of the invention being to provide a rake or similar device for picking up the load, with means for swinging the rake upwardly and then horizontally over a wagon or the like, with means for tilting the rake to dump the load thereof into the wagon.

Another object of the invention is to provide means for attaching the device to a hay wagon or rack so that it will be pulled along with the wagon.
This invention also consists in certain other features of construction and in the combination and arrangement of the several parts, to be hereinafter fully described, illustrated in the accompanying drawings and specifically pointed out in the appended claims.

In describing my invention in detail, reference will be had to the accompanying drawings wherein like characters denote like or corresponding parts throughout the several views, and in which:—

Figure 3 is an enlarged longitudinal sectional view through the rear part of the apparatus.

Figure 6 is an enlarged plan view of the hay fork and the front end of the truck.

Figure 1:
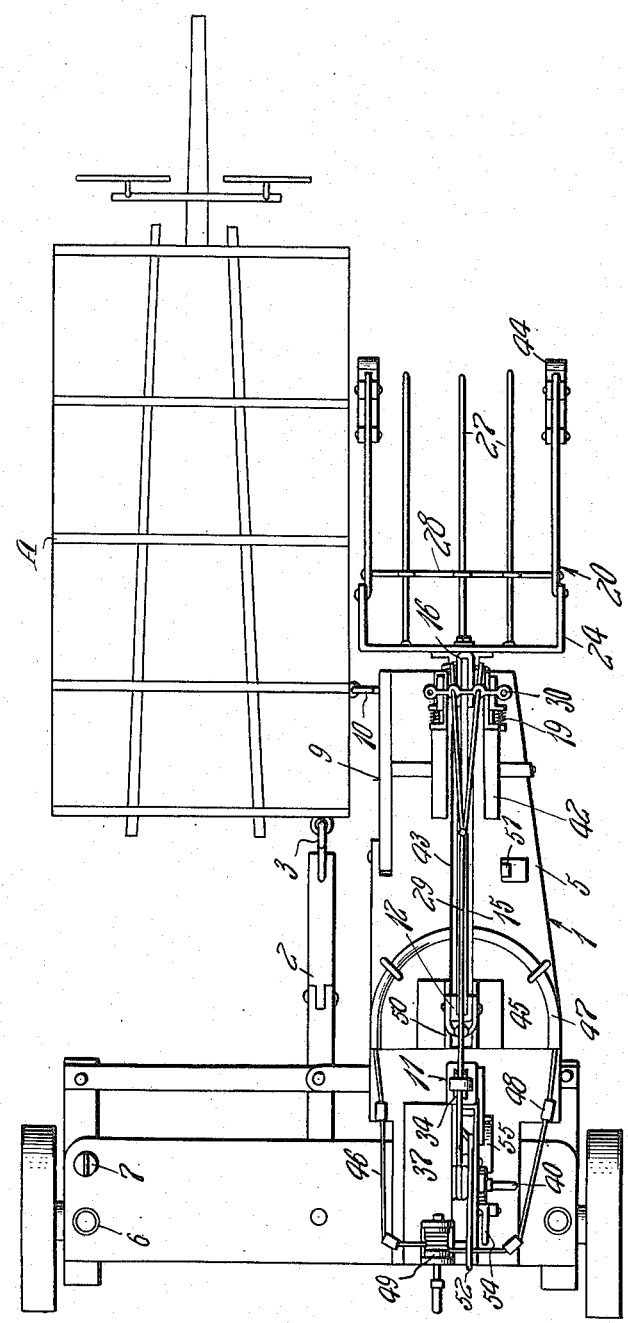
Figure 1 is a plan view of a wagon showing the device attached thereto.

In these views, 1 indicates a wheeled truck which is provided with the tongue 2 having a hook 3 thereon so that it may be attached to a hay wagon or rack shown at A. A platform 5 has its rear end pivotally connected with the truck, adjacent one end thereof, by the king bolt 6 and when desired the platform may be held against pivotal movement on the platform by means of a bolt 7 which passes through the platform and body of the truck. The front end of the platform 5 is supported by a caster wheel 8 and it is also attached to a part of the wagon by the bar 9 having a hook 10 thereon for engaging a part of the wagon, the bar being pivotally connected with the platform. Thus the platform and truck will be moved along with the wagon with the platform at one side of the wagon.

A post 11 is supported adjacent the rear part of the platform and a channel bar 12 is hingedly connected with the lower part of the post by means of a yoke 13 which is pivoted to the channel bar 12 and fastened to the post 11 by a pivotal bolt 14. A pair of parallel bars 15 are pivotally connected with the bar 12, one bar 15 being connected with the lower end of the bar 12 and the other bar with the upper end of the bar 12. The outer ends of these bars 15 are pivotally connected with a channel member 16 which has its flanges extended at its upper end, as at 17, these flanges being provided with the notches 18 at their upper edges and spring latch means 19 are associated with these notches. The hay fork 20 is fastened to the angle member 16 by the bolts 21 and washers 21', the upper bolt passing through an elongated slot 22 in the rear of the rake and the lower bolt passing through a triangular opening 23 in the rear of the rake. Thus the rake can have a certain amount of movement on the angle member 16 so that it can adjust itself to uneven ground. The rake is formed with a solid rear end, as shown at 24, and with solid lower side parts, as shown at 25. The upper side parts are formed of the bars 26 while the bottom of the rake is formed of the prongs 27 which are connected to the adjacent and rear ends by the cross piece 28. A short cable 29' is attached an appreciable distance from one end of a cable 29 and the ends of these two cables are passed through eyes on a cross bar 30 and through eyes of arms 33 which are carried by the channel member 16 and then the ends of the cables are fastened to the cross bar 30. The other end of the cable 29' is then fastened to the cable 29 and said cable 29 is then passed over a sheave 34 on the top of the post and passes down the post to a drum 35 which is connected with a large drum 36, the two drums being arranged in a housing 37 carried by the platform. A drum 38 is arranged in the housing and this drum is connected by a cable 39 with the drum 36 so that when the drum 38 is rotated by means of its crank handle 40 the cable will be wound thereupon and thus the drums 36 and 35 will be rotated so as to wind the cable 29 upon the drum 35 and raise the rake and the parallel bars. The parts are provided with suitable ratchet mechanism, as shown at 41, and if desired, I may provide a small gas engine for rotating the drums instead of doing it by hand. The cross bar 30 is designed to normally rest in the notches 18 in the extension 17 and is held in these notches by the latch means 19. When the rake and bars are in lowered position the outer ends of the bars rest between the spaced uprights 42 at the front end of the platform, the upper ends of which are provided with spring latch means 19 to receive the cross bar 30. This arrangement of parts will permit the cross bar to be freed from the channel member 16 so that the rake can be titled so that its prongs will pick up hay from the ground with the body of the rake either resting on the ground or arranged a short distance therefrom. The front part of the platform is slotted, as at 43, to permit the bars 15 to pass below the platform. Adjustable shoes 44 are carried at the front end of the rake for engaging the ground and preventing wear on the end of the rake. A semi-circular turn-table 45 is arranged on the platform and it is operated by the cables 46 which are fastened thereto and which pass through grooves 47 therein over the guiding pulleys 48 to a drum 49 which is rotatably mounted on the top of the housing. The cables are oppositely wound on said drum so that when one cable is being wound upon the drum the other is being unwound so that the turn-table can be rotated in either direction by the drum. Guiding flanges 50 are carried by the turn-table and these flanges engage the lower part of the angle member 12 so as to cause said member to turn with the table and thus swing the rake horizontally over the wagon or rack. A lever 52 is pivotally mounted to a part of the housing and it is connected by a link 53 with the upper end of the channel member 12 so that by manipulating said lever the channel member will be tilted or rocked on its pivotal connection with the member 13 and thus the rake will be tilted by the relative movements of the bars 15 caused by the rocking movement of the member 12. A lever 54 is arranged to operate a brake 55 for the drums 35 and 36 so as to hold these drums with the rake in adjusted position.

While the device is shown and described as a rake for loading hay upon a wagon it will of course be understood that it can be used for picking up various kinds of objects with but slight change to the different parts thereof. For instance, it can be so changed that it can be used in manufacturing plants.

Figure 2:
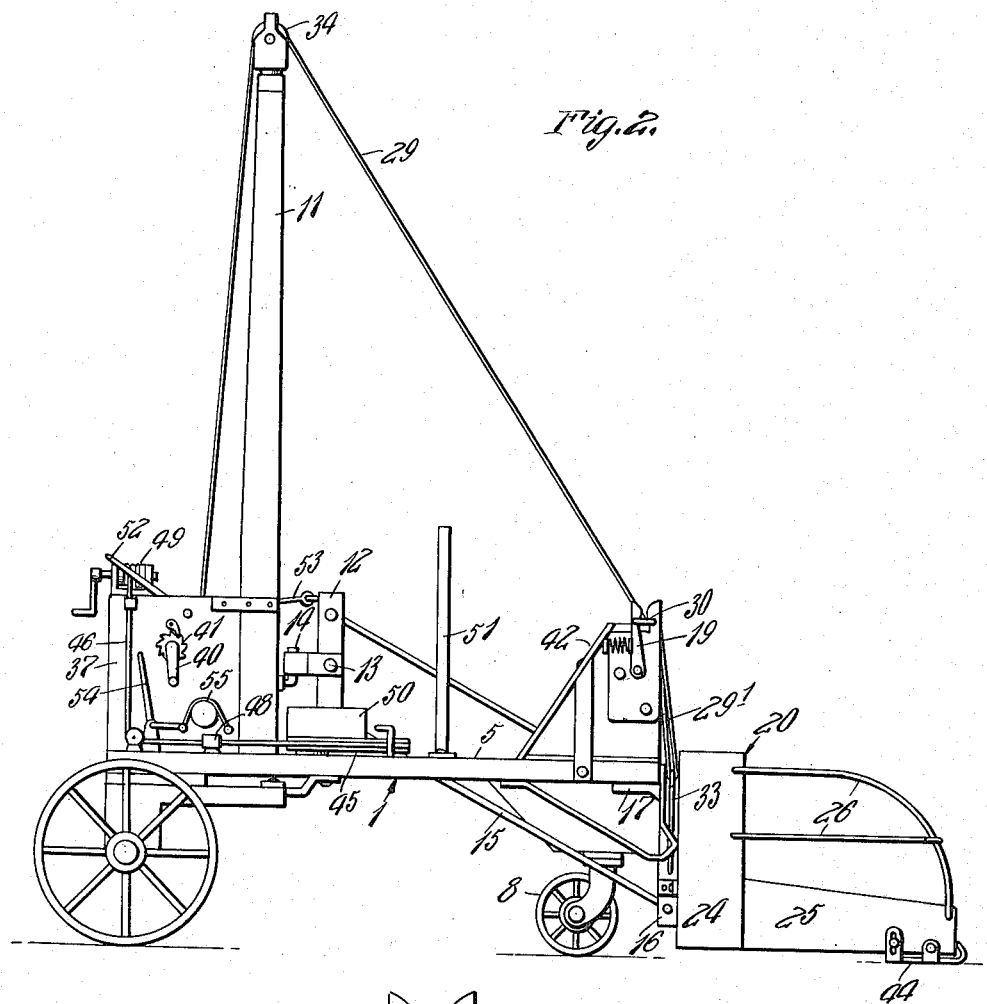
Figure 2 is a side view of the apparatus.
Figure 7:
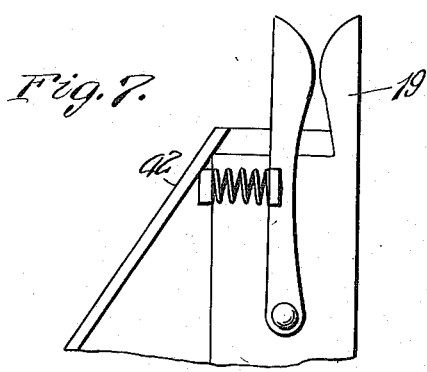
Figure 7 is a detail view of the latch means.
Figure 4:
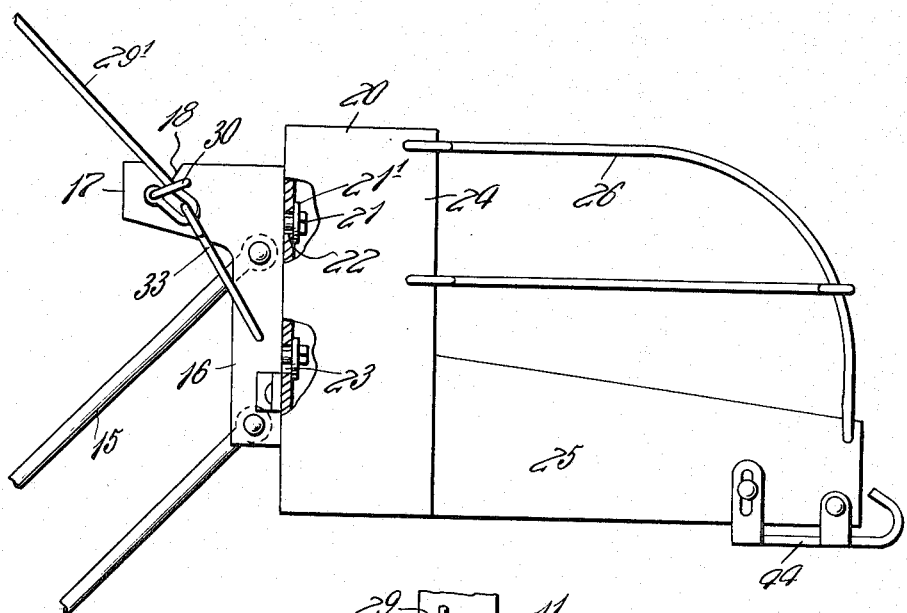
Figure 4 is a side view with parts broken away of the hay fork.
Figure 5:
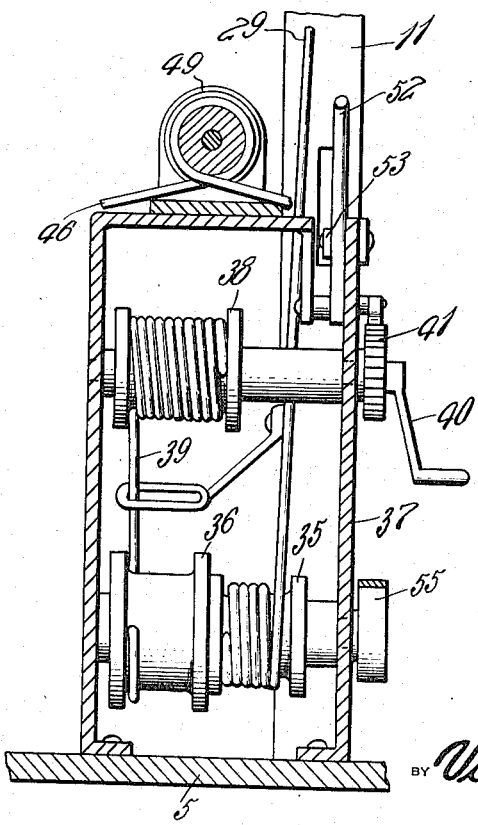
Figure 5 is a transverse sectional view through the rear part of the apparatus.

When the device is attached to a hay wagon it will travel along with said wagon and when the field is reached the drums are rotated so as to permit the rake to assume the position shown in Figure 2 wherein the cross bar 30 is shown as resting upon the upright 41 and the cables played out so that the rake is in a position near the ground with its shoes 44 resting upon the ground so that the prongs can pick up the hay. When the rake is loaded the drums are turned and this action will first cause the cable to move the rake upwardly in a substantially vertical plane until the extensions 17 of the member 16 engage the cross bar 30 when said cross bar will pass into the notches in said extensions and will be held in said notches by the latch means 19. On the further movement of the rake the cross bar will be freed from the latch means 42 and will be carried by the member 16 on the rake. Thus the rake moves upwardly in a substantially horizontal position so as to hold the load. When the rake reaches the position higher than the load on the wagon the drum 49 is turned, after the other drums are stopped and held against movement by the brake 55, so as to rotate the turn-table to swing the rake over the wagon. The lever 52 is then shoved forwardly so as to rock the member 12 and thus cause the bars 14 to tilt the rake to dump the load upon the wagon. The hoisting drums are then rotated again to draw the rake from under the load. The turn-table and rake are then moved back to their original positions and the rake is dropped by unwinding the cables on the drum so as to pick up a new load.

It is thought from the foregoing description that the advantages and novel features of my invention will be readily apparent.

I desire it to be understood that I may make changes in the construction and in the combination and arrangement of the several parts, provided that such changes fall within the scope of the appended claims.

What I claim is:—

1. A device of the class described comprising a wheeled platform, a post carried thereby, a rocking member hingedly connected with the post, upper and lower parallel bars pivotally connected with the ends of said member, a carrier pivotally connected with the outer ends of said bars, a pulley at the top of the post, a cable passing over the same and connected with the carrier, drums on the platform for winding up the cable, means for rocking the member to tilt the carrier and means for turning the rocking member on its hinge to move the carrier in a horizontal plane.

2. A device of the class described comprising a wheeled platform, a post carried thereby, a rocking member hingedly connected with the post, upper and lower parallel bars pivotally connected with the ends of said member, a carrier pivotally connected with the outer ends of said bars, a pulley at the top of the post, a cable passing over the same and connected with the carrier, drums on the platform for winding up the cable, means for rocking the member to tilt the carrier, means for turning the rocking member on its hinge to move the carrier in a horizontal plane, such means comprising a turn table having guiding flanges for receiving the lower end of the rocking member and manually operated means for operating the turntable.

3. A device of the class described comprising a wheeled platform, a post carried thereby, a rocking member hingedly connected with the post, upper and lower parallel bars pivotally connected with the ends of said member, a carrier pivotally connected with the outer ends of said bars, a pulley at the top of the post, a cable passing over the same and connected with the carrier, drums on the platform for winding up the cable, means for rocking the member to tilt the carrier, means for turning the rocking member on its hinge to move the carrier in a horizontal plane, such means comprising a turn table having guiding flanges for receiving the lower end of the rocking member, manually operated means for operating the turn table and means at the outer end of the platform for permitting the carrier to move in a vertical plane in the first part of its upward movement.

4. An apparatus of the class described comprising a wheeled platform, a post carried thereby, a pulley at the top of the post, a housing on the platform, drums arranged in the housing, a rocking member hingedly connected with the lower part of the post, upper and lower parallel bars pivotally connected with the ends of the rocking member, a carrier pivotally connected with the outer ends of said bars, a cable connected with one of the drums and passing over the pulley at the top of the post, means for connecting the cable with the carrier, a hand lever, a link connecting the same with the upper end of the rocking member for permitting the member to be rocked, a turn table, uprights thereon engaging the lower end of the rocking member for causing said member to turn with the table, a drum on the housing and oppositely wound cables thereon connected with the turn-table.

5. An apparatus of the class described comprising a wheeled platform, a post carried thereby, a rocking member hingedly connected with the lower part of the post, upper and lower parallel bars pivotally connected with the ends of the members, a member pivotally connected with the outer ends of the bars, a carrier movably connected with said member, a pair of spaced guides at the front end of the platform for receiving the outer ends of the bars and the said member between them when the carrier is in lowered position, pulleys carried by the said member, a cross bar, pulleys thereon, latch means on the said member and on the guides for engaging the cross bar, cables connected with the cross bar and passing over the pulleys, one cable being connected with the other, a pulley on the top of the post over which said other cable passes, a drum on the platform with which said cable is connected, means for rotating the drum, means for rocking the rocking member and means for moving said member on its hinge.

In testimony whereof I affix my signature.

ORUS J. EASLEY.